No. 626,855. Patented June 13, 1899.
S. W. CARY & E. SAARBACH.
FIRE EXTINGUISHER.
(Application filed Mar. 1, 1898.)
(No Model.) 2 Sheets—Sheet 1.
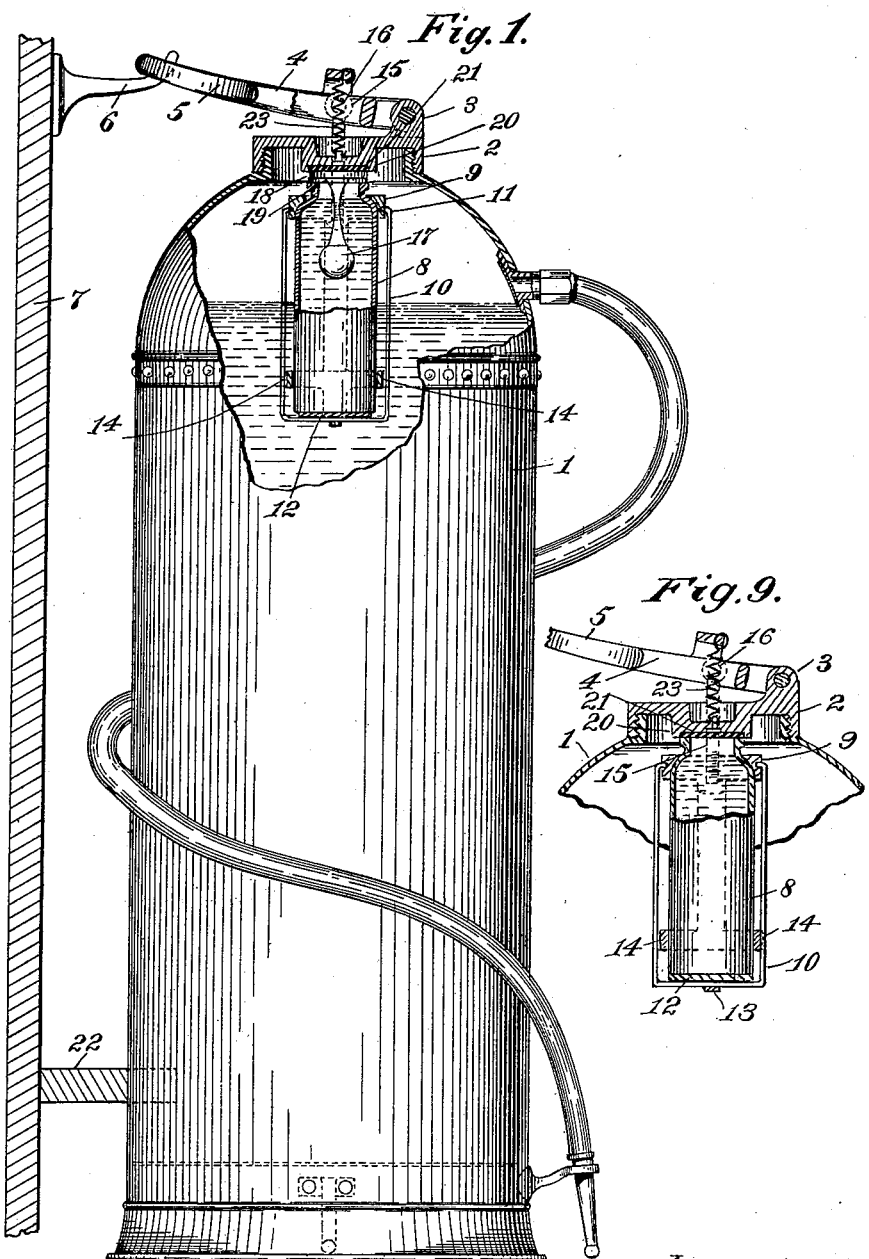
Witnesses.
R. W. Pittman
Louis J. Schroeder.
Inventors
S. W. Cary.
Edmund Saarbach
By their Attorney
Henry F. Noyes No. 626,855.  
Patented June 13, 1899.  
S. W. CARY & E. SAARBACH.  
FIRE EXTINGUISHER.  
(Application filed Mar. 1, 1898.)
(No Model.)  
2 Sheets—Sheet 2.
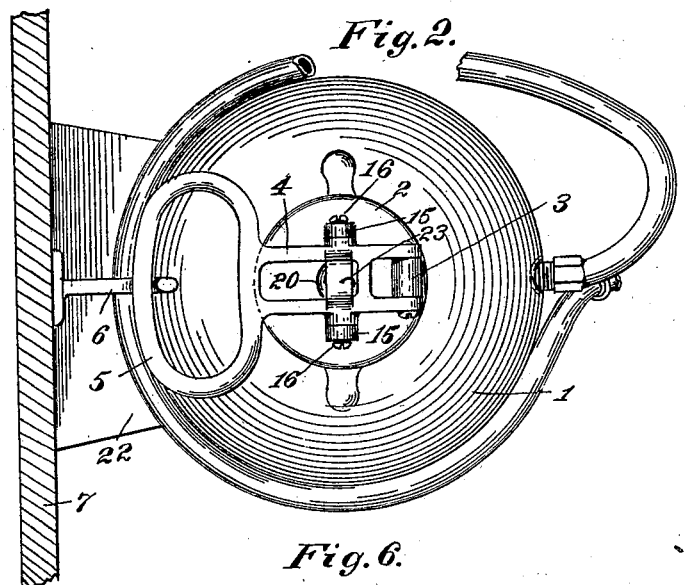
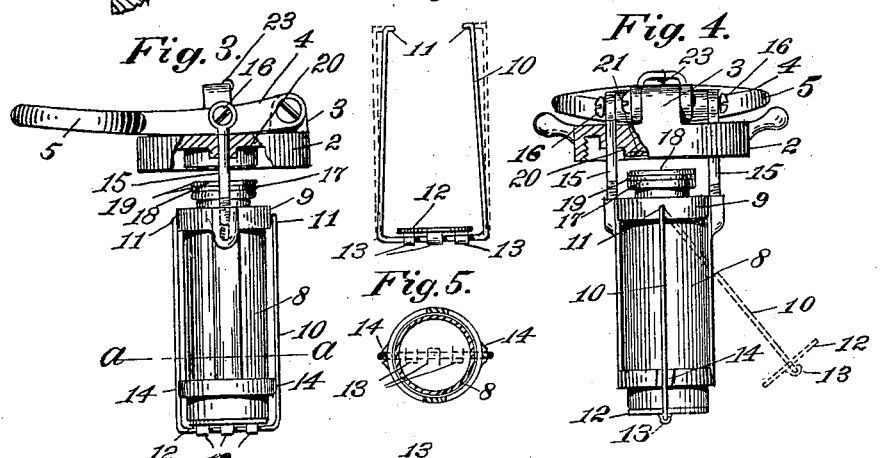
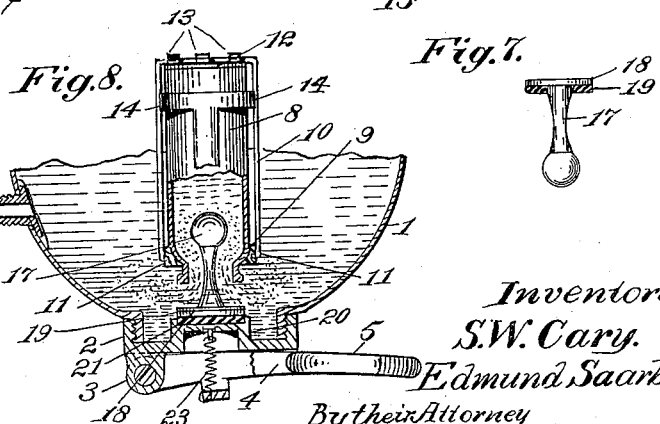
Witnesses.  
R. W. Pittman  
Louis J. Schroeder
Inventors  
S. W. Cary.  
Edmund Saarbach  
By their Attorney  
Henry F. Noyes
THE NORRIS PETERS CO., PHOTO-LITHO., WASHINGTON, D. C.

UNITED STATES PATENT OFFICE.

STEPHEN W. CARY AND EDMUND SAARBACH, OF NEW YORK, N. Y.

FIRE-EXTINGUISHER.

SPECIFICATION forming part of Letters Patent No. 626,855, dated June 13, 1899.

Application filed March 1, 1898. Serial No. 672,127. (No model.)

*To all whom it may concern:*

Be it known that we, STEPHEN W. CARY, a resident of the borough of Manhattan, and EDMUND SAARBACH, a resident of the borough of Brooklyn, in the city and State of New York, have invented certain new and useful Improvements in Fire-Extinguishers, of which the following is a specification.

This invention relates to portable fire-extinguishers, and in particular to that class thereof which consist of a receptacle containing a fluid and provided with a smaller vessel containing a substance which is adapted, when mingled with said fluid, to generate a pressure, and thereby force said fluid from said receptacle.

One object of this invention is to provide such a receptacle with a means whereby the same may be hung in a suitable accessible position, which means shall be adapted, when the receptacle is removed from its place and inverted, to effect the commingling in the main receptacle of the contained substance and fluid, thereby to generate fluid-pressure.

A further object of this invention is to provide the receptacle with a smaller inner vessel adapted to contain a pressure-generating ingredient and to connect said vessel with a depending means so disposed that the major portion of the weight of said receptacle is carried upon the mouth of the vessel, so that the cap-piece of said receptacle is adapted to produce a tight joint with said mouth when said receptacle is supported by said depending means.

A further object of this invention is to provide a valve for this vessel which shall be normally adapted to close the mouth thereof in case a sudden jolt or jar should relieve the mouth of the vessel of the weight of the receptacle.

A further object of this invention is to provide a means of moving the mouth of the inner vessel away from the cap-piece of the receptacle and of adjusting the amount of this movement.

Further objects of this invention will be hereinafter mentioned.

In the drawings accompanying and forming a part of this specification, Figure 1 is a side elevation of one form of this improved fire-extinguisher, the upper portion thereof being shown in section. Fig. 2 is a plan view of the same. Fig. 3 is a side elevation of the inner vessel and its supporting means. Fig. 4 is a front elevation of the same. Fig. 5 is a cross-section taken on line $a\ a$ of Fig. 3. Fig. 6 is an elevation of a cage or carrier for supporting the vessel. Fig. 7 is an elevation of a valve for closing the mouth of the vessel. Fig. 8 is a sectional view showing an upper portion of the receptacle inverted to intermingle the contents thereof to generate fluid-pressure. Fig. 9 is an elevation showing a means of closing the mouth of the vessel when the valve is removed.

One of the chief difficulties in the use of fire-extinguishers of this class is in keeping the mouth of the inner vessel tightly closed at all times except when it is desired to operate the extinguisher, any leakage at this or any point making it possible for the gas or pressure generating substance and the fluid to become intermingled, and thereby produce pressure to discharge the fluid contents of the receptacle at an undesired moment. Another difficulty is experienced in using fire-extinguishers of this class, arising from the fact that of the means for opening and closing the mouth of the inner vessel that portion of said means which is adapted to move through the cap of the outer receptacle and which normally is disposed within the receptacle soon becomes rusted from the chemical action of the pressure-generating substances, and when the opening of the mouth of the inner vessel is effected by an upward or outward movement of this operating means relative to and through the receptacle-cap if the interiorly-disposed portion of this means has become rusted it will not readily move through the cap, and often it becomes so rusted that it will not move at all and the device becomes inoperative. This difficulty is enhanced by the fact that it is often the practice to permit fire-extinguishers of this class to stand for an indefinite period without attention or inspection, probably until the emergency arises for their use, and if they are not always prepared for an emergency they are useless. This difficulty is obviated in this invention, in which the means for opening the mouth of the inner receptacle consists of a downwardly and inwardly operating means, and as the outer portion of this means, not being exposed to the chemical action of the gas-generating substances, does not become rusted it is always free to move through the receptacle-cap, and the apparatus is always ready for use.

In the description of one form of this invention there is provided a main receptacle 1, having a cap 2 firmly screwed or otherwise fastened to the mouth thereof. Pivoted to a suitable lug or support 3, rigidly or otherwise connected with the cap 2, is a supporting-arm 4, having at the outer end thereof an elliptical ring or handle 5, adapted to receive or engage a projecting hook or bracket 6, which may be suitably fastened to the wall 7.

Situated within the receptacle 1 is the smaller vessel 8, adapted to contain the pressure-generating substance. A cage for supporting this vessel is provided and consists of a collar or ring 9, having pivoted thereto a carrier comprising a U-shaped member 10, having at its upper end inwardly-extending projections 11, which may be an integral part of the carrier, as illustrated in the drawings, or which may be constructed in another manner, as by enlarging the upper ends of this carrier and providing these enlarged ends with inwardly-extending screws, and the collar 9 is provided with recesses in which to receive these projections or screws. A seat 12 is provided, having downwardly-extending ears 13, so disposed as to receive and retain the carrier in engagement with the seat. To prevent the carrier from oscillating upon the projections 11 and becoming an unstable support for the vessel, the latter may be provided with jaws 14, adapted to engage and retain the carrier, while the collar 9 fits the vessel so closely as to prevent any movement of the vessel relative to the collar. The carrier 10 is constructed of wire of a suitable material and is of an elastic nature, whereby the projections 11 thereof may be disengaged from the jaws 14 and the vessel removed from its support, or the lower part of the carrier may be disengaged from the jaws 14 and the seat 12 swung from beneath the vessel, when the latter may be removed, leaving the carrier still in engagement with the collar, as the elasticity of the wire normally acts to retain the projections 11 in engagement with the collar, as when in its disengaged position (see Fig. 6) the projections would take a position considerably nearer together.

To support the cage and vessel, two depending uprights 15 may be provided, extending through the cap 2 and suitably fastened to the arm 4, as by pins or screws 16. These uprights are preferably threaded at their lower ends and adjustably screwed into tapped holes provided in the collar 9, whereby the uprights are adapted to support the cage and vessel 8. The object of this threaded connection will be referred to farther on.

In one embodiment of this invention there is provided to close the mouth of the vessel 8 a valve or closer 17, made of suitable material and weighted at its lower end. The upper end thereof is provided with a cap 18 and suitable packing-ring 19. In the normal position of the vessel the weight of this valve is adapted to hold it in contact with the mouth of the vessel, and thereby to close the same. The cap 2 is provided with a downwardly-extending cup 20, having a packing plate or disk 21, the object of which will be referred to farther on.

When the receptacle is hung in place, supported by the arm 4 upon a bracket 6 and guided by a lower bracket 22, the greater portion of the weight of the receptacle and contents is transmitted, through the cap 2, to the vessel 8 and thence to the carrier 10 and arm 4. By means of this disposal the valve is held in close contact with the mouth of the vessel and adapted to make a perfect joint therewith. In case the receptacle should be subjected to a sudden jar or jolt, tending to move it vertically, and thereby to move it away from the mouth of the vessel, the inertia of the valve 17 will still act to keep it in close contact with the mouth of the vessel, and thereby prevent the escape of any of the contents thereof. Thus as the vessel moves or is moved away from or toward the cap the valve moves with it, thereby having a motion into and out of contact with the cap.

Disposed in a recessed portion of the cap and suitably fastened thereto is the spring 23, which is also fastened in any suitable manner to the arm 4. The tendency of the spring is to draw the arm 4 downward to the cap, and therefore to move the mouth of the vessel away from the cap 2, and if the spring be free to do this when the receptacle is inverted, as illustrated in Fig. 8, it will open the mouth of the vessel and permit the escape of the contents thereof, as in this position the weight of the valve acts to remove its cap 17 from the mouth of the vessel.

In the normal position of the receptacle the spring if free to act will also operate to move the mouth of the vessel away from the cap 2; but in this upright position the weighted valve still closes the mouth of the vessel.

When the receptacle is hung from a bracket upon the arm 4, as the weight, which is then supported by the upright 15, is many times greater than the resistance of the spring 23 the latter is easily compressed by this weight and the mouth of the vessel brought into close contact with the valve-cap 18 and the latter in close contact with the lower surface of the cup 20, whereby any escape of the contents of the vessel is prevented.

In the construction of fire-extinguishers of this class it is desirable that they should be adapted for use under varying conditions. For instance, upon a railroad-car they must be subject to continual vibration, jars, and many sudden movements. It is to such conditions that the hereinbefore-described form of this invention is particularly adapted. Under other conditions, such as would be imposed by use in a building where the receptacle is not exposed to sudden jars, the presence of an independent valve is not so essential and may be omitted. Such a form of construction is embodied in Fig. 9, wherein the mouth of the vessel is brought into direct contact with the disk 21 of the cap 2 and forms the joint therewith.

In the construction of this improved fire-extinguisher it has been found in practice that the best results have been obtained by giving the mouth of the vessel a certain travel to and from the under surface of the cap 2, thereby to effect an unvarying area of opening. In order to provide a means of obtaining the same area of opening when the valve is removed, the uprights 15 have been provided with a means of adjustment in the collar 9, whereby the collar, and hence the vessel, may be adjusted to or from the under surface of the cap 2, according as the service for which the fire-extinguisher is destined may or may not require the use of a valve. Thus will become evident the advantages of this invention. As the greater portion of the weight of the receptacle and its contents rests upon the mouth of the vessel, a very tight closure of the mouth is obtained and the possibility of an undesired commingling of the contents of the extinguisher obviated. The possibility of an undesired commingling of the contents of the receptacle through a sudden jar or vibration of the receptacle has also been obviated.

A ready means of adjusting the construction of the extinguisher to suit varying conditions of service has been obtained, and also a ready and easily-operated means of removing the vessel from its carrier has been provided.

We claim as our invention—

1. In a fire-extinguisher, the combination of a receptacle having a closure; a vessel disposed in said receptacle; shiftable means for supporting said extinguisher, and embodying means for supporting said inner vessel with one end thereof in engagement with said receptacle-closure during a predetermined period, thereby to maintain the inner vessel closed; and a shiftable closure for said inner vessel and operative to maintain said vessel closed when it is out of engagement with said receptacle-closure.

2. In a fire-extinguisher, the combination of a receptacle having a closure; a vessel disposed in said receptacle; shiftable means pivotally connected to said closure for supporting said extinguisher; means pivotally connected with said shiftable supporting means and projecting through said closure for supporting said inner vessel with one end thereof in engagement with said receptacle-closure during a predetermined period, thereby to maintain said inner vessel closed; and a shiftable gravity-closure for said vessel and operative to maintain said vessel closed when it is out of engagement with said receptacle-closure.

3. In a fire-extinguisher, the combination of a receptacle having a closure; a vessel disposed in said receptacle; shiftable means for supporting said extinguisher; means connected with said shiftable supporting means for supporting said vessel with one end thereof in engagement with said receptacle-closure during a predetermined period, thereby to maintain the inner vessel closed, and having an adjustment whereby the movement of said inner vessel with its shiftable supporting means is regulated; and a shiftable closure for said inner vessel and operative to maintain said vessel closed when it is out of engagement with said receptacle-closure.

4. In a fire-extinguisher, the combination of a receptacle having a closure; a vessel disposed in said receptacle; a shiftable arm pivotally secured to said closure for supporting said extinguisher; means for supporting the inner vessel with one end thereof in engagement with said receptacle-closure during a predetermined period, thereby to maintain said inner vessel closed, and comprising depending means pivotally connected to said shiftable supporting-arm and projecting through said closure, and a carrier, said depending means and carrier having an adjustment whereby the movement of said inner vessel is regulated; and a shiftable gravity-closure for said inner vessel and operative to maintain said vessel closed when it is out of engagement with said receptacle-closure.

5. In a fire-extinguisher, the combination with an outer receptacle provided with a cap, of an arm pivoted to said cap and having a spring-actuated inward movement toward said cap; an inner receptacle adjustably supported from said arm and provided with a suitable mouth; a valve interposed between said mouth and said cap and having a motion independent of either, and adapted to close the mouth of said inner receptacle when said arm is in its spring-actuated position; as and for the purpose set forth.

6. In a fire-extinguisher, the combination, with an outer receptacle having a closure, of shiftable supporting means secured to said closure; depending means secured to and movable with said shiftable supporting means and extending through said closure; an inner vessel disposed within said receptacle; and an oscillatory carrier secured to said depending means for rigidly supporting said inner vessel against movement.

7. In a fire-extinguisher, the combination, with an outer receptacle, of a closure therefor; shiftable supporting means pivotally secured to said closure; depending means secured to and movable with said shiftable supporting means and extending through said closure; an inner vessel disposed within said outer receptacle; and a removable, oscillatory carrier pivotally secured to said depending means for rigidly supporting said inner vessel against movement.

8. In a fire-extinguisher, the combination, with an outer receptacle, of a closure therefor; shiftable supporting means secured to said closure; an inner vessel; and means secured to said shiftable supporting means for supporting said inner vessel, and comprising a plurality of depending members having a collar adapted to encircle said inner vessel, and a carrier pivotally secured to said collar and having means for supporting the lower end of said inner vessel.

9. In a fire-extinguisher, the combination, with an outer receptacle, of a closure therefor; shiftable supporting means secured to said closure; an inner vessel; and adjustable means secured to said shiftable means for supporting said inner vessel and having an adjustment whereby the movement of said inner vessel is regulated, and comprising a plurality of depending members projecting through said closure and having an annular collar adapted to encircle said inner vessel, and a pivotally-connected carrier having means adapted to support one end of said inner vessel.

10. In a fire-extinguisher, the combination, with an outer receptacle, of a closure therefor; shiftable supporting means secured to said closure; an inner vessel; and means secured to said shiftable supporting means for supporting said inner vessel, and comprising a pair of depending arms projecting through said closure and having a pair of annular collars adapted to encircle said inner vessel, and a carrier pivotally secured to one of said collars and having a support extending under said inner vessel, said carrier having a catch connection with one of said collars, whereby the carrier is maintained against movement.

11. In a fire-extinguisher, the combination, with an outer receptacle, of a closure therefor; a shiftable supporting-arm secured thereto; a spring intermediate said closure and arm; an inner vessel; supporting means for said inner vessel, and comprising a pair of depending members pivotally secured to said shiftable arm and extending through said closure; a pair of annular collars secured to said arm and encircling said inner vessel; an oscillatory carrier pivotally secured to one of said collars and having a support for one end of said inner vessel, and having a catch connection with one of said collars.

12. In a fire-extinguisher, the combination, with an outer receptacle, of a closure therefor; shiftable supporting means secured to said closure and adapted to support said extinguisher; a spring intermediate said supporting means and closure; an inner vessel; and adjustable means for supporting said inner vessel, said adjustable means extending through said closure and secured to said extinguisher-supporting means, whereby it is shiftable therewith, said means having an adjustment, thereby to move the inner vessel toward or from the receptacle-closure to permit the same to have greater or less play with said extinguisher-supporting means.

13. In a fire-extinguisher, the combination, with an outer receptacle having a closure provided with a packing on its inner face, of shiftable supporting means pivotally secured to said closure; an inner vessel; and means secured to said shiftable supporting means and extending through said closure for supporting said inner vessel with its mouth end in engagement with said closure-packing, whereby said closure and its packing constitute a means for maintaining said inner vessel closed.

14. In a fire-extinguisher, the combination, with an outer receptacle having a recess on its inner face, of a packing secured therein; a shiftable arm pivotally secured to said closure; a spring intermediate said closure and arm; an inner vessel; and means secured to said shiftable supporting means and extending through said closure for supporting said inner vessel with its mouth end in engagement with said closure-packing, whereby said closure and packing constitute a means for maintaining said inner vessel closed.

STEPHEN W. CARY.
EDMUND SAARBACH.

Witnesses:
HENRY F. NOYES,
P. MILLS.